Feb. 12, 1952 — R. J. MILLER — 2,585,485
DISTORTABLE FASTENER
Filed Dec. 18, 1944
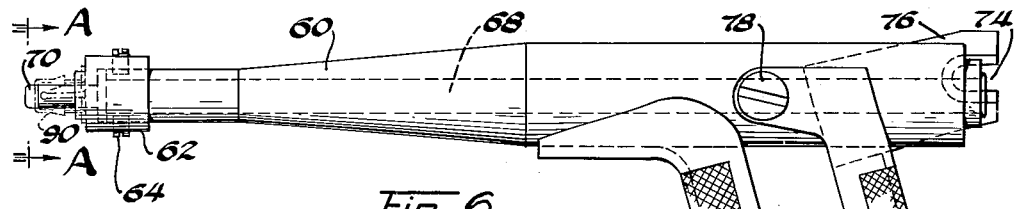
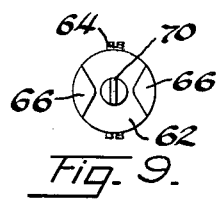
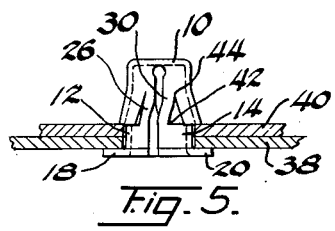
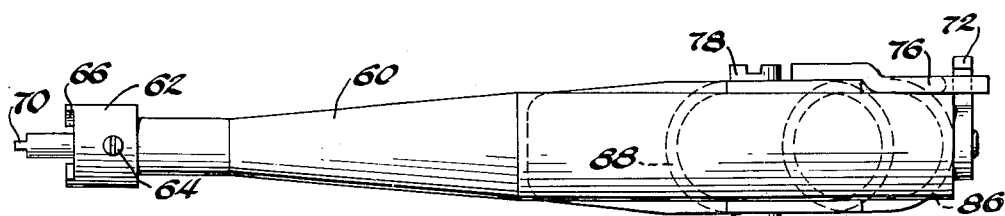
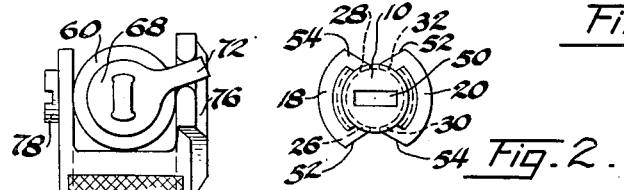
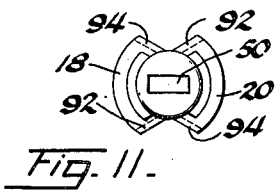
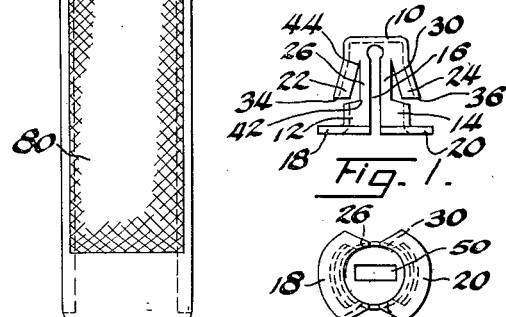
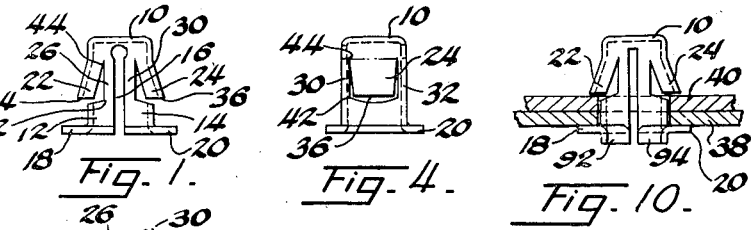
INVENTOR.
Raymond J. Miller
BY
A. E. Wilson
ATTORNEY.

Patented Feb. 12, 1952

2,585,485

UNITED STATES PATENT OFFICE 2,585,485

DISTORTABLE FASTENER

Raymond J. Miller, Detroit, Mich.

Application December 18, 1944, Serial No. 568,597

3 Claims. (Cl. 85—5)

This invention relates to fasteners and more particularly to threadless one-piece fasteners that can be projected through aligned holes in members to be secured together, and distorted by rotational movement to contract axially to clamp the members together.

In the fastening industry there has been a long-felt need for a fastener that could be manufactured economically and applied readily to secure members together. There have been many attempts to solve these problems, but in the majority of instances a plurality of parts were required. It has generally been necessary that access be had to both sides of the members being secured together to permit properly aligning the separable elements of the fastener, and it was necessary that some manual operation be performed to secure the elements together such as the threading of a screw into a nut. While certain of these fasteners have been economical to manufacture considerable labor is required to secure them in place.

Fasteners of the so-called blind type are required extensively in industry for use where, due to the construction of the article being fabricated, it is impossible to gain access to both sides of the members to be secured together when the fastener is inserted. Difficult fastening problems of this nature are common in the manufacture of hollow articles or sub-assemblies that are frequently encountered in the aircraft, automotive and household appliance fields.

An object of this invention is therefore to provide a one-piece threadless fastener that can be projected through aligned holes in members to be secured together and distorted by movement of one portion of the fastener relative to another portion to move spaced portions of the fastener axially thereof to engage and securely clamp members to be held together.

A further object of the invention resides in the provision of an improved fastener of the so-called blind type that can be projected through aligned holes in members to be secured and distorted by a tool applied to the exposed face of the fastener to rotate one portion relative to another to move clamping projections into engagement with opposite surfaces of members to be secured together.

Another object is to provide a one-piece threadless blind fastener of generally thimble shape adapted to be projected through aligned holes in members to be secured together and distorted from the exposed face to oscillate about its longitudinal axis to move spaced work engaging projections toward each other to clamp the members together.

Yet a still further object of the invention is to provide a fastener having spaced work engaging projections separated by axially extending distortable columns operable to move the work engaging projections toward each other to securely clamp spaced members together when the fastener is actuated to the clamping position.

Another object resides in the formation of a thimble shaped one-piece fastener having a flanged base adapted to be held against rotation, and an apertured head portion adapted to project through aligned holes in members to be secured together and rotated by a tool relative to the flanged base to distort the body portion intermediate the base and head to move work engaging projections toward the flanged base into clamping engagement with the members to be secured together.

Yet a further object of the invention is to provide a tool having relatively movable members to engage spaced portions of a threadless blind fastener to rotate one portion of the fastener relative to another portion to move work engaging portions of the fastener toward each other into clamping engagement with members to be secured together.

Another object resides in the provision of a novel fastener applying tool having concentric relatively movable members to hold one portion of a fastener against rotation and to rotate another portion upon actuation of a manually operable member.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Fig. 1 is a side elevation of a fastener embodying the present invention.

Fig. 2 is a top plan view thereof.

Fig. 3 is a bottom plan view of the fastener.

Fig. 4 is a side elevational view of the fastener taken at right angles to the Fig. 1.

Fig. 5 is a sectional view illustrating the fastener in the operated position to clamp a plurality of members together.

Fig. 6 is a side elevation of a tool for applying the fastener, shown with a fastener in place thereon.

Fig. 7 is a plan view of the tool illustrated in Fig. 6.

Fig. 8 is a rear elevation of the fastener applying tool.

Fig. 9 is a front elevation of the relatively movable fastener engaging portions of the tool.

Fig. 10 is a side elevational view of a modified form of fastener shown in assembled relation with a pair of members to be secured together and shown in non-clamping position.

Fig. 11 is a top plan view of the fastener illustrated in Fig. 10.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now particularly to Figs. 1 to 4, it will be observed that my improved fastener may be formed of a single strip of metal by suitable metal deforming operations such as may be performed by dies or on an eyelet machine.

A strip of metal is deformed substantially in the middle to provide an inner head portion 10 of generally cylindrical cross-section. The metal of the strip is deformed to provide spaced semi-cylindrical walls 12 and 14 separated by an axially extending slot 16. The semi-cylindrical walls 12 and 14 terminate in outer radially extending flanges 18 and 20.

The semi-cylindrical walls 12 and 14 cooperate to provide a generally cylindrical body portion adapted to project through aligned holes in members or plates to be secured together, the inner head portion 10 projecting through the aligned holes and the outer flanges 18 and 20 engaging the walls of the outer plate as illustrated in Figs. 5 and 10.

Spaced work engaging radially extended projections 22 and 24 are struck out of the semi-cylindrical walls 12 and 14 between the inner head 10 and the outer flanges 18 and 20 as illustrated in Figs. 1 to 5 to overlie the walls of the inner plate surrounding the hole through which the fastener is projected.

It will be noted that the work engaging projections 22 and 24 struck out of the semi-cylindrical walls 12 and 14 interrupt the body portions of the walls 12 and 14 intermediate the head 10 and flanges 18 and 20 to provide spaced columns 26 and 28 interconnecting the head 10 and the flange 18, and to provide spaced columns 30 and 32 interconnecting the head 10 and the flange 20.

The columns 26 and 28 carrying the work engaging projection 22 and the columns 30 and 32 carrying the work engaging projection 24 may be varied in width with reference to the width of the work engaging projections 22 and 24 to increase or decrease the resistance of the fastener to rotational bending or twisting between the inner head 10 and the outer flanges 18 and 20.

The flanges 18 and 20 formed on the outer end of the fastener are contoured to provide abutments to be engaged by a tool to hold the base of the fastener against rotation, and the head 10 at the inner end of the fastener is also contoured to provide abutments to be engaged by a tool to permit the inner or free end of the fastener to be rotated relative to the outer end thereof. Rotation of opposite ends of the fastener relative to each other deforms or twists the columns 26, 28, 30 and 32 carrying the work engaging projections 22 and 24 to cause a shortening of the distance between the ends 34 and 36 of the work engaging projections 22 and 24 and the flanges 18 and 20.

Fig. 5 illustrates the fastener in the clamped position to secure two plates or members 38 and 40 together. It will be noted that the fastener is projected through aligned holes in the members 38 and 40 and that the outer flanges 18 and 20 engage the outer surface of member 38, and the work engaging projections 22 and 24 overlie the inner surface of the inner plate 40.

When the inner end 10 of the fastener is rotated relative to the outer end, the columns 26, 28, 30 and 32 are twisted or distorted to cause a shortening of the axial length of the fastener to move the contacting portions 34 and 36 of the work engaging projections 22 and 24 into clamping engagement with the walls of the inner plate 40 surrounding the hole to secure the plates together.

The shortening of the distance between the work engaging projections 22 and 24 and the flanges 18 and 20 will tighten the members 38 and 40 together and maintain them securely clamped together.

The extent of the axial contraction between the contacting portions 34 and 36 of the work engaging projections 22 and 24, and the flanges 18 and 20 can be varied through relatively wide limits by varying the axial length of the slots between the work engaging projections and their associated supporting columns. By reducing the length of the axial slots illustrated as extending from 42 to 44 the contacting portions 34 and 36 will move a greater distance towards the flanges 18 and 20, and by increasing the axial length 42—44 of the slots the extent of movement will be decreased, for a given amount of axial rotation of the head 10.

The fastener may be so designed that as it is projected through the aligned holes in the members to be secured together, the work engaging projections are contracted somewhat and snap back to their original position when projected through the holes to occupy a position overlying the edges of the inner member 40 as illustrated in Fig. 10. The semi-cylindrical walls 12 and 14 of the body portion can be contracted somewhat by momentarily reducing the width of the slot 16 between the walls as the fastener is projected through the aligned holes and expanded to substantially their original position to project the work engaging members 22 and 24 to overlie the inner face of the plate 40. If desired the axially extending slot can be eliminated and the semi-cylindrical walls 12 and 14 can abut each other. The work engaging projections 22 and 24 would in that instance embody sufficient resiliency to move to the position to overlie the inner member 40 when the fastener is projected through the aligned holes.

Attention is directed to the fact that it is not essential in all cases that the work engaging projections overlie the edges of the inner plate surrounding the hole through which the fastener is projected. The associated supporting column that moves towards each work engaging projection will force the projection radially outwardly to a position to overlie the edge of the inner member 40 when the fastener is distorted or twisted to the locking or clamping position.

The inner head portion 10 and the flanges 18 and 20 may be contoured in any convenient manner to permit them to be engaged and rotated relative to each other to actuate the fastener to the clamping or holding position illustrated in Fig. 5. For example the inner head 10 may be formed with a slot 50 to receive a rectangular shaped blade whereby the inner end of the fastener may be rotated, and the flanges 18 and 20 may be provided with angularly related surfaces 52 and 54 whereby the outer end or base of the fastener can be held against rotation.

Any suitable means may be provided to rotate spaced portions of the fastener relative to each other. One desirable form of fastener installing means is illustrated in Figs. 6 to 9 inclusive wherein a hollow cylinder 60 is provided with a collar 62 secured thereto in any convenient manner as by means of screws 64 to permit varying the angular relation of the collar 62 relative to the cylinder 60. The collar 62 has angularly related axially extending projections 66 adapted to align with and engage the angularly related surfaces 52 and 54 of the radially extending flanges 18 and 20 at the base of the fastener to hold the forward end of the fastener against rotation.

A rotatable member 68 is journalled in the hollow cylinder 60, and is provided with a contoured portion such for example as a rectangular shaped blade 70 to project into the contoured slot 50 formed in the head 10 of the fastener. The contoured portion 70 of the member 68 extends beyond the holding projections 66 of the collar 62 a distance substantially equal to the axial length of the fastener, and the contoured portion of the blade 70 is of sufficient length to accommodate the axial movement of the head 10 as the fastener is distorted or twisted to the clamping position.

Any suitable means may be provided to rotate the member 68 within the cylinder 60 to distort the fastener to the clamping or locking position. For example the rotatable member 68 may be provided with a radially extended projection 72 adapted to extend into a slot 74 formed in a member 76 mounted for angular movement on the cylinder 60 as illustrated at 78. The member 76 is provided with a handle grip 80 spaced from a cooperating handle grip 82 fixed to the cylinder 60. A spring 84 is provided to yieldingly urge the handle 80 toward the non-operated position illustrated in Fig. 1. The handles 80 and 82 have rounded edges as illustrated at 86 and 88 to facilitate manipulation.

The operation of this fastener installing tool is as follows. The fastener 90 to be applied may be positioned on the end of the applying tool as illustrated in dotted lines in Fig. 1, with the blade 70 of the member 68 projecting through the slot 50 in the head 10 of the fastener and the flanges 18 and 20 engaging the front surface of the collar 62 with the angularly related surfaces 52 or 54 of the flanges 18 and 20 engaging the holding projections 66 of the collar 62. The fastener installing tool may then be moved to project the head 10 of the fastener 90 and the work engaging projections 22 and 24 through the aligned holes in the members to be secured together. The handle grip 80 may then be actuated to move the grip 80 toward the grip 82 thereby oscillating the member 76 about its pivot 78 to move the projection 72 downwardly to rotate the member 68 and blade 70 relative to the cylinder 60 and collar 62. The head 10 of the fastener 90 is therefore rotated relative to the flanges 18 and 20 to distort the columns 26, 28, 30 and 32 to move the contacting portions 34 and 36 of the work engaging projections 22 and 24 axially toward the flanges 18 and 20 to clamp the members together.

If desired the fastener can be projected through the aligned holes in the members to be secured together, and the fastener applying tool positioned thereon to hold the base of the fastener and to rotate the inner end of the fastener to effect the desired clamping together of the members to be secured together.

The angular rotation imparted to the fastener by actuation of the applying tool can be varied by changing the stroke of the handle 80 relative to the handle 82. If desired adjustable means may be interposed between the member 76 and the cylinder 60 to permit increasing or decreasing the stroke to effect a desired distortion of the fastener each time the applying tool is actuated.

Figs. 10 and 11 illustrate a modified form of the invention wherein downwardly extended flanges 92 and 94 are provided to engage the holding projections 66 carried by the collar 62 to hold the base of the fastener against rotation as the head is twisted to clamp the fastener into engagement with the members to be secured together. Where the flanges 92 and 94 are employed it is unnecessary to hold the end of the applying tool accurately in alignment with the axis of the fastener in order to prevent the contacted portions of the flanges 18 and 20 from slipping off of the holding projections 66 of the collar 62 of the applying tool.

It will be apparent that the flanged portions 18 and 20 of the fastener can be contoured in any desired manner to be engaged by the holding portion of the applying tool to hold it against rotation. For example the flanges 18 and 20 may be apertured to receive pins carried by the collar 62, or projections may be struck out of the faces of the flanges to project into slots in the face of the collar.

The flanged portions 18 and 20 of the fastener can be held against rotation by means of a lug secured to or struck out of the face of the outer of the members to be secured together, or one or both of the flanged portions of the fastener can be secured to the outer plate by a welding or other suitable operation to secure the fastener in place and to prevent it from rotating. Where these expedients are resorted to a one-piece tool such as the portion 68 having the contoured blade 70 can be employed to rotate the head portion relative to the base to move the fastener to the actuated or clamped position. It will also be apparent that a plurality of these improved fasteners can be mounted in a channel and movable therein to any desired position, the channeled portion engaging the flanges to hold the base of the fastener against rotation. If desired the flanged portions 18 and 20 can be provided with sharp projections adapted to be driven into wood or fibrous material to secure the fastener in place and to hold its base against rotation. When this fastener is used with fabric or soft material, a washer can be projected over the axially extending portion of the fastener to hold the fabric or other soft material and to provide a platform to be engaged by the radially extended work engaging projections.

The applying tool may be of any desired proportions, it being unnecessary that it extend axially as far as illustrated. A very short applying tool can thus be formed. If desired a gooseneck type gun can be provided to permit installing the fastener at any desired angle, by providing suitable gearing to rotate the member 68 to rotate the head of the fastener as the base thereof is held against rotation.

It will also be apparent that power means may be provided to actuate the fastener applying tool, such for example as electric or fluid pressure operated means. If desired a magazine feeding mechanism may be employed to automatically feed fasteners to the operative position on the fastener applying tool.

The fastener may be formed of any desired metal, alloy or plastic material. It is desirable that the material be sufficiently hard that it will take a permanent set when distorted or twisted to the clamping position to prevent springback that would cause a loosening of the members being secured together. I have found that quarter-hard or quarter-bright steel possesses the desired characteristics but it will be understood that a wide range of materials and hardness factors are suitable for use in the making of my improved fastener.

I claim:

1. A threadless distortable fastener comprising a pair of substantially parallel confronting semi-cylindrical walls, a head interconnecting said walls at one end, each of said semi-cylindrical walls having a radially extended work engaging flange at its other end, and an angularly inclined work engaging projection carried by each of the semi-cylindrical walls and extending toward its associated work engaging flange, each of the semi-cylindrical walls providing a pair of spaced axially extending columns interconnecting the head and one of the radially extended work engaging flanges, the columns being relatively long and narrow so as to be readily distortable, the head and the work engaging flanges having spaced walls adapted to receive fastener distorting means to rotate the head and work engaging flanges angularly relative to each other to distort said columns beyond their elastic limits and move each work engaging projection toward its associated work engaging flange.

2. A threadless distortable fastener comprising a pair of confronting semi-cylindrical walls, a head interconnecting said semi-cylindrical walls at one end, each of said semi-cylindrical walls having a radially extended work engaging flange at its other end, and a work engaging projection carried by each of the semi-cylindrical walls and extending toward its associated work engaging flange, each of the semi-cylindrical walls providing a pair of spaced relatively long and narrow readily distortable columns supporting each of said work engaging projections whereby each work engaging projection is moved toward its associated work engaging flange when said columns are distorted beyond their elastic limits by rotating the head of the fastener angularly relative to its work engaging flanges.

3. In a fastening device, a fastener adapted to be projected through aligned holes in members to be secured together and actuated from the exposed face of the fastener to clamp said members together comprising a head having a longitudinally split cylindrical body portion, a radially extended work engaging flange carried by each split section of the cylindrical body portion to contact the face of one of the members to be secured together, and an angularly related work engaging projection carried by each split section of the cylindrical body portion and extending toward the radially extended work engaging flange carried by each split section of the cylindrical body portion, each split section of the cylindrical body portion being relatively long and narrow so as to be readily distortable and being uninterrupted from the head to its associated work engaging flange on opposite sides of the associated work engaging projection, the head and radially extended work engaging flanges having walls shaped to receive fastener clamping means to distort beyond the elastic limit the uninterrupted portions of each split section of the cylindrical body on opposite sides of said work engaging projections to move the work engaging projections angularly toward the radially extended work engaging flanges carried by each split section of the cylindrical body portion.

RAYMOND J. MILLER.

REFERENCES CITED

The following references are of record in the file of this patent:

UNITED STATES PATENTS

| Number | Name | Date |
| --- | --- | --- |
| 2,035,429 | Hall | Mar. 24, 1936 |
| 2,055,427 | Churchill | Sept. 22, 1936 |
| 2,115,251 | Buck | Apr. 26, 1938 |
| 2,154,712 | Van Uem | Apr. 18, 1939 |
| 2,159,363 | Chaffee | May 23, 1939 |
| 2,184,783 | Tinnerman #2 | Dec. 26, 1939 |
| 2,244,976 | Tinnerman | June 10, 1941 |
| 2,245,375 | Wiley | June 10, 1941 |
| 2,254,130 | Anderson | Aug. 26, 1941 |
| 2,255,650 | Burke | Sept. 9, 1941 |
| 2,400,545 | Kost | May 21, 1946 |
| 2,408,340 | Poupitch | Sept. 24, 1946 |

FOREIGN PATENTS

| Number | Country | Date |
| --- | --- | --- |
| 15,005 | Great Britain | June 27, 1912 |